United States Patent [19]

Kahle et al.

[11] Patent Number: 5,467,473
[45] Date of Patent: Nov. 14, 1995

[54] OUT OF ORDER INSTRUCTION LOAD AND STORE COMPARISON

[75] Inventors: James A. Kahle; Chin-Cheng Kau, both of Austin, Tex.

[73] Assignee: International Business Machines Corporation, Armonk, N.Y.

[21] Appl. No.: 1,976

[22] Filed: Jan. 8, 1993

[51] Int. Cl.[6] ..................................................... G06F 9/38
[52] U.S. Cl. .................... 395/800; 395/375; 364/DIG. 1; 364/243.3; 364/232.23
[58] Field of Search .................................. 395/400, 425, 395/375, 800, 325, 575, 725; 364/731, 736, 191, 142, 140

[56] References Cited

U.S. PATENT DOCUMENTS

| | | | |
|---|---|---|---|
| 4,408,274 | 10/1983 | Wheatley et al. | 395/425 |
| 4,574,349 | 3/1986 | Rechtschaffen | 395/425 |
| 4,607,332 | 8/1986 | Goldberg | 395/375 |
| 4,630,195 | 12/1986 | Hester et al. | 395/375 |
| 4,638,429 | 1/1987 | Watabe et al. | 395/375 |
| 4,697,233 | 9/1987 | Scheuneman et al. | 395/425 |
| 4,757,440 | 7/1988 | Scheuneman | 395/575 |
| 4,827,405 | 5/1989 | Kiuchi | 395/375 |
| 4,831,517 | 5/1989 | Crouse et al. | 395/375 |
| 4,905,200 | 2/1990 | Pidsosny et al. | 395/425 |
| 4,965,716 | 10/1990 | Sweeney | 395/325 |
| 4,991,090 | 2/1991 | Emma et al. | 395/575 |
| 5,051,940 | 9/1991 | Vassiliadis et al. | 364/736 |
| 5,101,341 | 3/1992 | Circello et al. | 395/375 |
| 5,131,086 | 7/1992 | Circello et al. | 395/375 |
| 5,133,077 | 7/1992 | Karne et al. | 395/800 |
| 5,136,697 | 8/1992 | Johnson | 395/375 |
| 5,185,871 | 2/1993 | Frey et al. | 395/375 |
| 5,202,975 | 4/1993 | Rasbold et al. | 395/500 |
| 5,241,633 | 8/1993 | Nishi | 395/375 |
| 5,253,349 | 10/1993 | Kreitzer | 395/375 |
| 5,261,071 | 11/1993 | Lyon | 395/425 |

FOREIGN PATENT DOCUMENTS

| | | |
|---|---|---|
| 302999 | 2/1989 | European Pat. Off. . |
| 523337 | 1/1993 | European Pat. Off. . |

OTHER PUBLICATIONS

IBM TDB, "MSIS MP Version", vol. 36, No. 1, Jan. 1993, pp. 317–322.
IBM TDB, "MSIS Combining Serialization–MF–OSC within a Single Control" vol. 36, No. 1, Jan. 1993, pp. 229–235.
IBM TDB, "Pipeline Prefetch Detector", vol. 30, No. 1, Jun. 1987, pp. 191–192.

Primary Examiner—Mehmet Geckil
Attorney, Agent, or Firm—Mark E. McBurney

[57] ABSTRACT

A processing system allows for out of order instruction execution and includes at least one load/store unit for loading instructions to a register for processing by a fixed point unit, floating point unit, or the like, and store the results to memory. A load queue maintains the addresses and program numbers of the load instructions. During execution the address of the store instruction is compared to the address in the load queue of previously executed load instructions. A program counter compares the program number of the store instruction with the program number of the load instruction in the load queue. If the addresses are different, then no impermissible out of order situation exists between the load and store instructions being compared, because the data is not at the same address. If the address is the same, and the store program number is greater than the load program number, then the instructions have been executed in order (the load correctly preceded the store) and no problem exists. However, if the addresses are the same and the load instruction has been incorrectly reordered to precede the store instruction, then a reordering conflict exists and the load instructions must be re-executed.

19 Claims, 4 Drawing Sheets

| PROG. NO. | INSTRUCTION |
|---|---|
| 0 | LOAD R1 (A) |
| 1 | STORE R2 (A) |
| 2 | LOAD R3 (B) |
| 3 | ADD R4, R3, R1 |

| PROG. NO. | INSTRUCTION |
|---|---|
| 0 | LOAD R1 (A) |
| 2 | LOAD R3 (B) |
| 3 | ADD R4, R3, R1 |
| 1 | STORE R2 (A) |

| PROG. NO. | INSTRUCTION | | PROG. NO. | INSTRUCTION | |
|---|---|---|---|---|---|
| 0 | ADD | R1, R3, R4 | 0 | STORE | R7 (A) |
| 1 | STORE | R1 (A) | 2 | LOAD | R5 (A) |
| 2 | LOAD | R5 (A) | 1 | STORE | R1 (A) |
| 3 | ADD | R7, R5, R6 | 3 | ADD | R7, R5, R6 |
| 4 | STORE | R7 (A) | 4 | STORE | R7 (A) |

OUT OF ORDER INSTRUCTION LOAD AND STORE COMPARISON

CROSS REFERENCE TO RELATED APPLICATIONS

"Data Processing system with Multiple Execution Units Capable of Executing Instructions Out of Sequence", Ser. No. 07/750,132, filed Aug. 26, 1991, assigned to IBM Corporation.

"Method and System for Increased Instruction Synchronization Efficiency in a Superscalar Processor System", filed Jan. 8, 1993, having attorney docket number 08/001,863, assigned to IBM Corporation.

"Method and System for Increased Instruction Dispatch Efficiency in a Superscalar Processor System", filed Jan. 8, 1993, having attorney docket number 08/001,867 assigned to IBM Corporation.

BACKGROUND OF THE INVENTION

1. Field of the Invention

The present invention generally relates to processing instructions in a computer system. More particularly, a system for processing out of order load and store instructions is provided with the capability to check for the correct execution of load operations relative to store operations.

2. Description of Related Art

Currently, computer systems are generally available that provide for out of order execution of load and store operations. It is known in the art that processing speed is enhanced if store instructions can be executed after the load instructions, i.e. delay executing the store operations as long as possible. However, a problem exists for certain sequences of instructions since data that is to be loaded from a particular memory address may not have had the correct value previously stored therein. In this case, the store instruction must precede the load instruction. The present invention detects this situation and reloads the queue with the required instruction.

U.S. Pat. No. 4,630,195 describes a system for determining data dependency wherein data transfer commands are generated and a register in local storage is assigned to the data being transferred. A tag that identifies the register in which the data is stored and subsequent data transfer is compared to the stored tags to determine any potential dependencies. IBM Technical Disclosure Bulletin Vol. 30, No. 1, June 1987, Pages 191–192, discusses a problem using pipelined architecture wherein during the execution of a store instruction the possibility exists that the data could already be stored in a memory location previously loaded into the pipeline. An expression is derived that will determine if the difference between a program counter and the memory address is equal to one or two, which would be the case if the data is in a memory location already loaded into the pipeline.

U.S. Pat. No. 4,965,716 describes a priority queue wherein elements are kept in a unsorted stack. The stack is searched for the next highest priority element after the highest priority element has been read from a holding register. A priority comparison is implemented to determine the highest priority element. In U.S. Pat. No. 4,574,349 a program instruction calls for transfer of data from a particular main storage location to a general purpose register. This system uses pointers to allow subsequent load instructions involving the same particular main storage location to make data stored in a hardware register immediately available to a central processing unit if the data from the previous load instruction is still stored in one of the hardware registers.

U.S. Pat. No. 4,697,233 ensures data integrity by including a compare stack in a computer system having a pipelined architecture. The stack structure is partially duplexed such that a predetermined number of bits of each data word are stored in a compare stack. At readout, the bits are available for comparison to bits stored in the stack registers to determine that proper decoding has occurred, thereby ensuring data integrity of data in the pipeline.

U.S. Pat. No. 4,638,429 discusses a data processing apparatus using pipeline control that includes an Operand Store Conflict (OSC) circuit for detecting if a succeeding instruction uses an operand to be modified by a preceding instruction whose store operation has not been completed. The OSC detects the execution result of an in order store instruction whose store operation has not been completed is utilized as an operand of a fetch instruction which exceeds the store operation. When a conflict is detected and a store operation is the preceding instruction, a control unit aligns the fetched operand to the operand position of the succeeding instruction and merges them accordingly.

The prior art does not provide any type of system which compares load and store operations to allow for out of order execution of instructions. Some conventional systems are capable of determining any data dependency conflicts that may be present prior to the execution of the instructions, but do not compare the sequence of data load and store operations subsequent to execution of the instructions. In fact, it is not possible to detect load and store conflicts prior to execution, since the memory address for the store data is not generated until the store instruction is executed. Conflicts between data load and store operations occur fairly infrequently, however it is essential that these conditions be detected and corrected. Failure to correct these conflicts will result in processing errors, such as incorrect data, and the like. Thus, it can be seen that a need exists for a system that can detect out of order load and store instructions which cause conflicts when executed.

SUMMARY OF THE INVENTION

In contrast to the prior art, the present invention provides a system including an instruction cache unit (ICU) and dispatch unit for providing instructions to a processor bus. The dispatch unit is capable of altering the order of the instructions to obtain greater processing efficiency. A completion unit is also included which maintains the order of the instructions as they were provided from the ICU to the dispatch (prior to any reordering). At least one load/store unit is provided for loading instructions to a processing unit, such as a fixed point unit, floating point unit, or the like. Further, load and store queues are provided that include the addresses of the instructions. During execution of the store instruction, the address is compared to the address of previously executed load instructions, in a load queue, which executed out of order ahead of the store. A program counter compares the program number of the store instruction being executed with the program number of the load instruction in the load queue. The present invention then compares the addresses for the load and store instructions, and the program number for these instructions. If the addresses are not the same, then no problem exists. That is, if the addresses are not the same, then no conflict exists between the instructions being compared, because the data is not at the same address in memory. Further, if the address is the same, and the store program number is greater than the load program number then the instructions have been executed in order (the load correctly preceded the store) and no problem exists. However, if the addresses are the same and the load instruction had been incorrectly reordered to precede the store instruction, which is detected since the program number for the store instruction is less than the load instruction, then a problem exists and at least a portion of the instructions must be reordered and re-executed prior to providing them to the system.

Other objects, features and advantages will be apparent to those skilled in the art from the subsequent description taken in conjunction with the attached drawings.

DETAILED DESCRIPTION OF THE PREFERRED EMBODIMENTS

Figure 1:
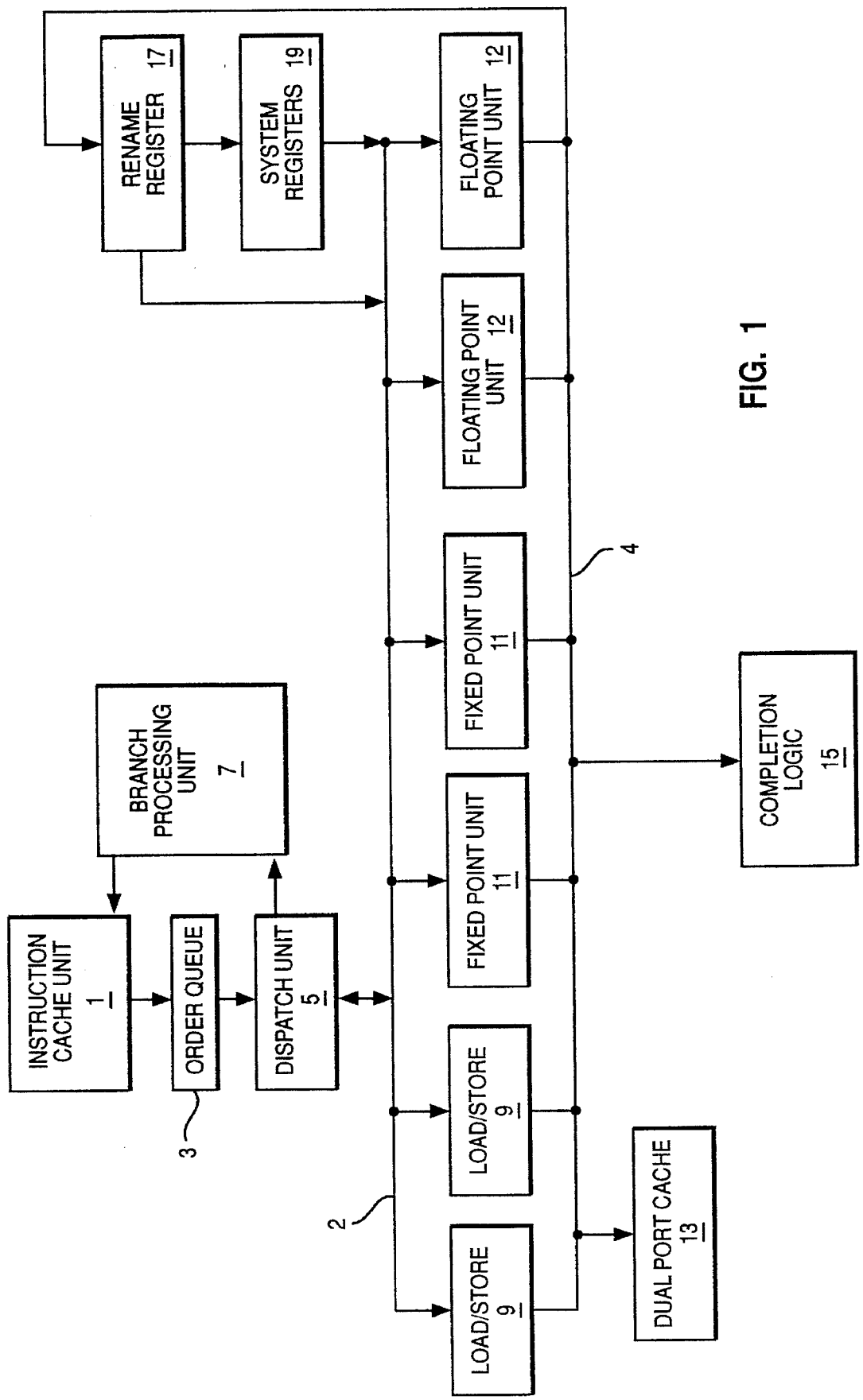
FIG. 1 is a schematic diagram of the components of a system that allows for out of order execution of load and store operations used in conjunction with the present invention.

Referring to FIG. 1, various elements of a processor system are shown. It should be noted that these elements may be included on multiple integrated circuit devices (chip) or incorporated onto a single device. In the preferred embodiment, the processor of the present invention is incorporated on a single chip which is one of the PowerPC processors designed and marketed by the IBM Corporation. (PowerPC is a trademark of the IBM Corp.). However, it will be understood by those skilled in the art that any processing system which includes the capability to alter the order of instructions is contemplated by the scope of the present invention. For example, various models of the IBM RISC System/6000 reduced instruction set computer may be capable of executing floating point instructions out of order and as such, would be capable of using the present invention.

Delaying the execution of store instructions will enhance processor performance since store operations place data, which is the result of manipulation by a processing unit, into a memory location, via a cache, buffer, or the like. On the other hand, load operations put data into the system registers, e.g. a floating point register, to be manipulated by a processing unit, thus performing actual computing operations. Therefore, it can be seen that doing as many load operations as possible, without using machine cycles to store data into memory, will enhance system performance. However, if a load instruction needs to retrieve data from a memory location, and the correct data has not yet been stored to that memory location, then a problem exists. That is, the correct data has not yet been stored to the memory location, due to the out of order instructions. The present invention detects and solves this problem by determining when an impermissible out of order condition exists and then reordering and re-executing the instructions.

FIG. 1, includes an instruction cache unit (ICU) 1 which contains instructions received from an operating system, such as the IBM AIX system (AIX is a trademark of the IBM Corp.), an application program, or the like. These instructions are to be executed by the processing system of the present invention. In particular, at least one floating point unit (FPU) 12 and at least on fixed point unit (FXU) 11 are included and shown in FIG. 1. These processing units are known in the art and described in detail in the IBM RISC System/6000 Technology publication, hereby incorporated by reference. More particularly, the FPU is described at pages 34–42 and the FXU is discussed at pages 24–32.

A dispatch unit 5 and branch processing unit 7 are also included in the system of FIG. 1. The dispatch unit receives instructions from the ICU 1 and organizes these instructions prior to their execution. Dispatch unit 5 determines if there are instruction efficiencies that can be exploited by altering the order of the instructions.

The branch unit 7 operates in conjunction with dispatch unit 5 and is utilized to reduce any pipeline penalty caused by branch instructions. Three types of branch executions are possible, an unconditional branch, a conditional branch that is not taken and a conditional branch that is taken. The unconditional branch and conditional branch which are not taken may not require an apparent machine cycle (zero-cycle branches), while the conditional branch that is taken may have a delay of up to three cycles. It will be understood that the efficiency achieved by the dispatch and branch units, i.e. exploiting the instruction interdependencies, may cause the branch unit to be transparent to the system. In other words, the increased efficiency (cycles saved) makes up for the cycles used by the dispatch and branch units. The branch unit 7 and dispatch unit 5 are described in the IBM RISC System/6000 Technology Publication.

Additionally, dispatch unit 5 operates with branch unit 7 to allow reordering of instructions, prior to their execution. More particularly, the conditional branch instruction may be loaded into an instruction queue (not shown) within dispatch 5 for execution by the branch unit. In an effort to minimize run-time delays in a pipelined processor, such as the superscalar processor of the present invention, the presence of a conditional branch is predicted. If the conditional branch is predicted as "not taken", the sequential instructions in the dispatch unit 5 are simply executed. However, if this prediction is incorrect, the instruction queue in the dispatch unit 5 must be purged of the sequential instructions which follow the conditional branch instructions and target instructions must be fetched from the ICU. Alternately, if the conditional branch is predicted as "taken", then the target instructions are fetched and utilized to follow the conditional branch, if the prediction is resolved as correct. Of course, if the prediction of "taken" is incorrect, the target instructions must be purged and the sequential instructions which follow the conditional branch instruction in program order must be retrieved. In general, the dispatch status of instructions within an instruction buffer, from which the dispatch unit dispatches instructions, is periodically determined. In response to a status of the instructions at the beginning of the instruction buffer, the remaining instructions are shifted within the instruction buffer and a partial group of instructions are loaded into the instruction buffer from the instruction queue, utilizing a selectively controlled multiplex circuit. In this manner, additional instructions may be dispatched to available processing units without requiring a previous group of instructions to be completely dispatched. Thus, the dispatch unit 5 is capable of providing out of order instructions to the processing units shown in FIG. 1, such as the FXU 12 and FPU 11. Previously noted Co-pending Patent Application, "Method and System for Increased Instruction Dispatch Efficiency in a Superscalar Processor System, filed Jan. 8, 1993, having attorney docket number 08/001,867, more fully describes the operation of dispatch unit 5 and is hereby incorporated by reference.

An order queue 3 is provided that will allow the completion logic unit 15 to maintain the sequence of instructions as they are provided from the ICU 1 to the dispatch unit 5. The instructions in the order queue 3 are used as a reference by the completion logic unit 15 to allow reordering of instructions back to their initial sequence, if required. Data bus 2 is utilized to provide instructions to at least one load/store (L/S) unit 9, which is utilized to load and store a general purpose register (GPR) file. The L/S unit 9 retrieves data from the GPR to be loaded into the processing units for execution, e.g. FXU 11 and FPU 12, and stores data that had been manipulated by the processing units into the GPR for subsequent placement into a memory location. An additional data bus 4 is provided that allows the L/S units 9 to communicate with the FXU and FPU, as well as dual port cache 13. This cache 13 is also connected to system memory 21 (FIG. 3) and temporarily stores the data being loaded and stored into the processing units and memory, respectively. Cache 13 is capable of loading and storing two data words from the load/store units 9.

Rename registers 17 allow for the renaming of data prior to its being placed into system registers 19, and provide the ability to more efficiently place data in the system registers 19. These system registers are a set of architecture registers which are organized by number and used to input data to the processing units, such as the FPU and FXU. Once the data is placed in the system registers they are committed to the architecture. However, the rename registers are a temporary pool of system registers which hold the data prior to input to the system registers. If data is placed in the rename registers, it is not yet committed to the architecture and can be removed prior to being input.

Figures 2, 3:
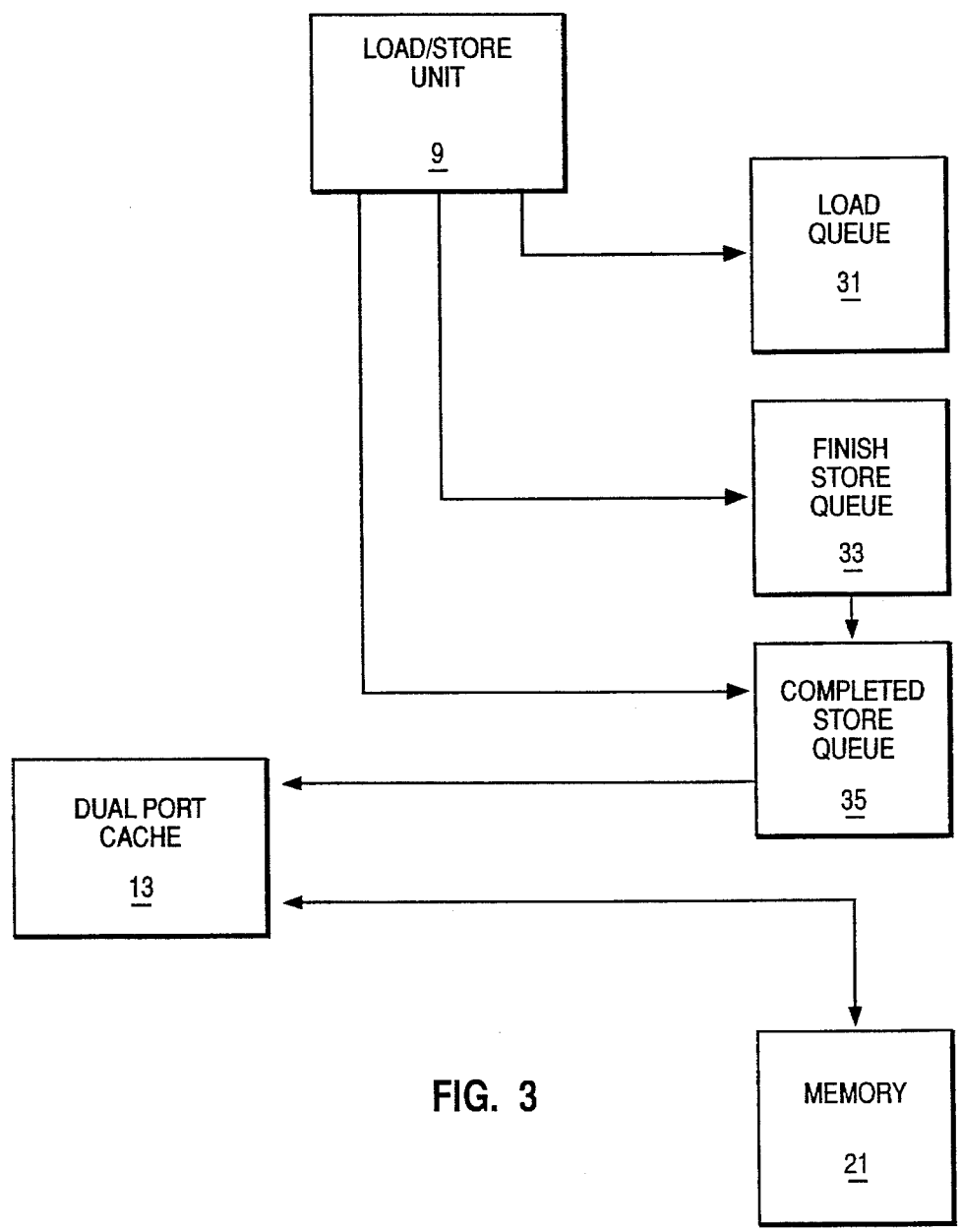
FIG. 2 is an example of instructions that may be executed out of order to increase processing efficiency.
FIG. 3 shows a block diagram including the load and store queues of the present invention connected to the cache used by the load/store units.

FIG. 2 shows some representative instructions that may be executed out of order to improve processing efficiency. Instruction 0 will load data into register R1, e.g. into register corresponding to processing units 11, 12, from memory location (address) A. Instruction 1 then stores new data from register R2 into memory location A, while instruction 2 loads data from memory location B into register R3. Instruction 3 adds the contents of register R1 to the contents of register R3 and places the result in register R4. If the sequence of instructions are executed in this manner, it can be seen that four functional steps are required. That is, one step loads the data from memory A to register R1, a second step stores data from register R2 into memory A, a third step loads data from memory B into register R3, and a fourth step adds the contents of registers R3 and R1 and places the sum in register R4. However, if the instruction sequence is altered, the same functions can be achieved in smaller number of steps. For example, if instruction 1 (store) is placed after the load instructions (0 and 2), then the load instructions can be executed in parallel during a single step. More particularly, instructions 0 and 2 can be executed simultaneously since the dual port cache 13 can retrieve two data words from memory. In this example, the contents of memory location A will be loaded into register R1 and the contents of memory location B will be loaded into register R3 during the first step. Next, instruction 3 adds the contents of registers R1 and R3 and puts the result in register R4 during the second step. Finally, manipulated data is stored into memory location A from register R2 in the third step. Thus, by altering the instruction sequence, the same operations can be performed with less processing time being utilized. The previous example is extremely simple, however those skilled in the art will understand how this type of instruction reordering can provide enormous savings of processing resources.

Referring to FIG. 3, specific elements of the present invention are shown in relation to the cache 13, load/store unit 9 and memory 21, previously described. Load queue 31 is provided for storing the address of load instructions which executed prior to the store instruction, along with the program number of the load instruction, as tracked by a program counter. These load addresses and program numbers are received from the load/store unit 9 and are removed from the load queue 31 when they are committed to the architecture, e.g. no other exception exists or condition, such as a pending interrupt is present. A finish store queue 33 is also interconnected to the load store unit and will maintain the address and program number of executed store instructions which have not yet been committed to the architecture. The address and program number of these executed store instructions are compared to the address and program number, in the load queue, of the load instructions in accordance with the present invention. The address and program number, in finish store queue 33, of store instructions which have been executed but are not yet committed to be stored in memory are placed in finish store queue 33. Next, the results of the store operations (data and address) will be placed in completed store queue 35, when the result is committed to the architecture. The store operations in completed store queue 35 will be placed in memory 21, via cache 13, by the completion logic unit 15. Load queue 31, finish queue 33 and completed store queue 35 are all a part of the queuing system of the processing system of the present invention.

The load queue 31, finish store queue 33 and completed store queue 35 are discrete components of the processing system of the present invention and can be physically located at various locations on the chip. These queues (31, 33, 35) are associated with cache 13 since the addresses stored therein must be provided to the cache so that the data can be retrieved from and stored to the memory 21. In a preferred embodiment of the present invention, the queues 31, 33, 35 are 64-bit registers which are capable of storing approximately 34 sets of addresses and program numbers.

Figures 4, 5:
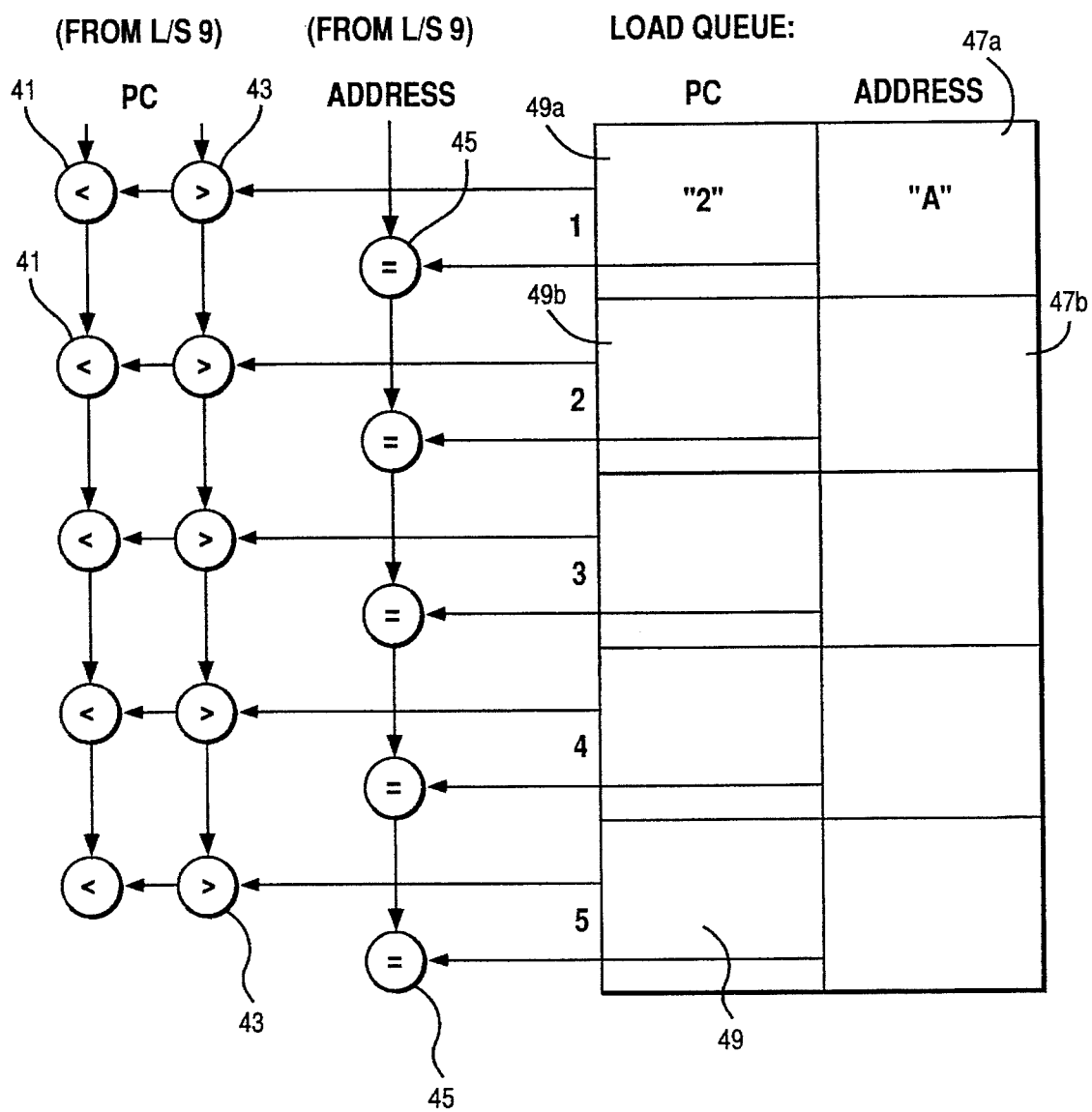
FIG. 4 is an example of a set of instructions that cannot be executed out of order and will be detected by the present invention.
FIG. 5 shows the load queue of the present invention and how the store instructions are compared with the load instructions to determine impermissible out of order conditions.

FIG. 4 will now be described to illustrate the problems that can be encountered when certain instructions are executed out of order and why it is necessary to detect this situation.

Instruction 0 adds the contents of certain hardware registers R3 and R4 and places the result into register R1. Instruction 1 then stores the contents of register R1 in memory location A. Next, instruction 2 loads the data from memory A into a register R5, and instruction 3 then adds the contents of register R5 with register R6 and places the result in register R7. Finally, instruction 4 stores the contents of register R7 into memory location A.

However, for this set of instructions a conflict will be created if the processing system, through the dispatch unit 5, reorders the sequence of the instructions. For example, if instructions 1 and 2 are reversed in order to place the store subsequent to the load a conflict will occur. Instruction 0 added the contents of registers R3 and R4 and put the result in register R1. Instruction 2 then loads whatever data is currently in memory A into register R5 and instruction 1 will subsequently store the data in register R1 into memory location A. Instruction 3 again adds the contents of registers R5 and R6 and places the sum into register R7. Therefore, the incorrect data has been loaded into register R5. Whatever data was originally in memory A was loaded in register R5, before the desired data (sum of registers R3 and R4) is placed in memory location A. This will cause the incorrect data to then be added to the contents of register R6 causing incorrect data to be placed in register R7. Thus, it can be seen that it is not always possible to execute store operations subsequent to load operations and detecting this type of condition is needed for systems that have the capability to execute instructions out of order.

FIG. 5 is a schematic representation of the load queue 31. As described previously, the load/store unit 9 will place every load instruction address and program number in the load queue. Then, when a store instruction executes, a comparison is made between the address being generated by the load/store unit 9 during execution of the store instruction and the addresses (corresponding to the load instruction) in the load queue. Additionally, the program number for the store instruction being executed is compared with program numbers 49 of the load instructions in the load queue.

Figure 6:
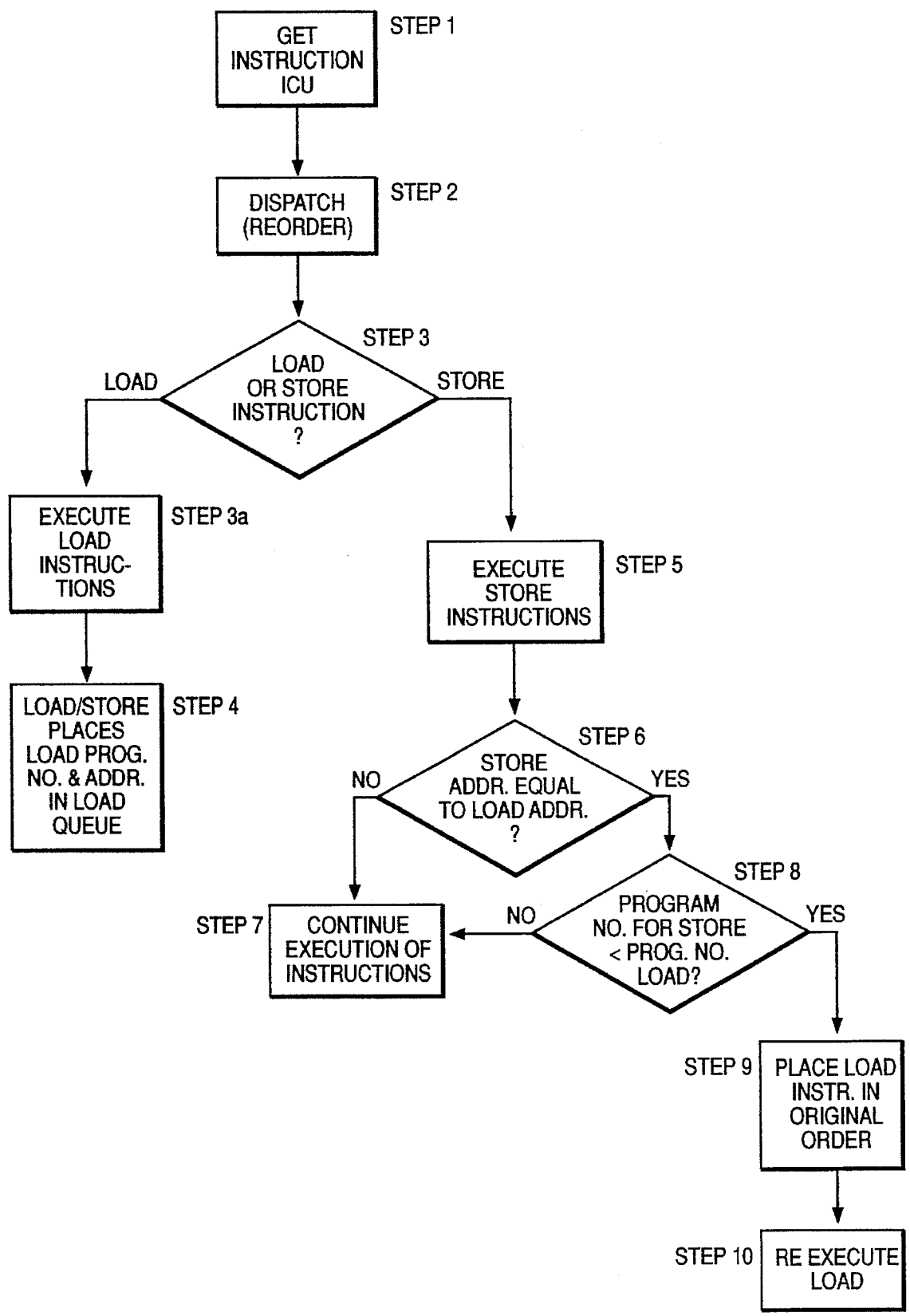
FIG. 6 is a flow chart showing the sequence of events that the present invention utilizes in order to detect out of order load and store conflicts.

The present invention then determines if the address for the store operation is the same as one of the addresses 47 for a load instruction in the load queue. FIG. 6 illustrates a load queue 31 having five positions for load instruction addresses and program numbers. Of course, five positions is used for illustrative purposes only and a load queue having additional positions is contemplated by the present invention. In any event the store address from L/S 9 is compared to addresses 47 by a comparator 45 and the program number from a program counter in the load/store 9 is compared with the program number 49 for the loads in load queue 31 by comparators 41 and 43. Comparators 41 will determine if the program number from the store instruction is less than the program number of load, and comparators 43 will determine if the store program number is greater than the load program number. The program numbers cannot be equal since the comparison is between loads and stores, which are different instructions. The comparators 45 determine if the address of the store is the same as the address, in the load queue, of the load instruction. In a preferred embodiment of the present invention, comparators 41, 43 and 45 will be implemented in Boolean logic array including a series of and, or, exclusive or, nand, nor gates, or the like. More particularly, specialized circuitry can be utilized for the address comparator which will determine, by using exclusive or (XOR), logic the binary value of the address in the load queue and the binary value of the address being generated for the store. If the values are identical then the circuit will output a binary 1 and if the address values are different, then a binary 0 is output. All of the addresses in the load queue are compared with the generated store address to determine if any identical addresses exist. Similarly, specialized circuitry is also used to determine if the program number for the store instruction is less than the load instruction program numbers in the load queue. In this case, a subtract circuit may be used which will subtract one program number from the other and determine which is less than the other based on whether the resulting value is positive, or negative. For example, if the store program number is subtracted from the load program number and the result is positive, then the store program number is less than the load number. However, if the result is negative, then the store program number is greater than the load program number. In this manner, the present invention is capable of determining whether the store and load instructions are using the same memory, and which of these instructions should execute first. Other embodiments include hardwired implementations and software comparators, particularly microcode, and are all contemplated by the scope of the present invention.

A description of the operation of the present invention will now be described with regard to the flow chart of FIG. 6. At step 1, the instruction set is retrieved from the instruction cache unit 1 and provided to the dispatch unit 5 which then may reorder the instructions to take advantage of any efficiencies, as described above in conjunction with FIG. 2 (step 2). It is then determined at step 3 whether a load or store instruction is being considered. If a load instruction is encountered, then the system proceeds to step 3a where the load instructions are executed. The load/store unit 9 then places the program number and address for the load instructions that have been executed in the load queue 31 at step 4. However, if a store instruction has been encountered at step 3, then the system jumps to step 5 and the store instructions are executed. A comparison is then made between the address generated during execution of the store instruction and the load addresses in the load queue (step 6). If at the step 6, it is determined that the store addresses and load addresses are not equal, then the system proceeds to step 7 and continues execution of instructions. On the other hand, if the comparison of step 6 determines that the store address equals one of the load addresses in the load queue, then another comparison is made, at step 8, to determine if the program number for the store instruction is less than the program number. If the store program number is greater than the load program number, then the load operation properly occurred prior to the store operation for that memory address and no conflict exists. The operation then proceeds to step 7 and execution of instructions continues. However, if the store program number is less than the load program number, then it must be greater than the load program number (since they cannot be equal). In this case, a conflict exists and the system proceeds to step 9 which marks the load as incorrectly executed and places the load instructions back in their original order. This reordering back to the original sequence is possible since the completion logic unit has maintained a record of the original sequence in which the instructions are provided from ICU 1 to dispatch unit 5, via order queue 3. Step 10 then re-executes the load instructions so that the store will correctly precede the corresponding load instructions, since the store instructions have been allowed to complete.

An example of the present invention as shown in FIG. 5 will now be described in conjunction with the instructions of FIG. 4. For the purposes of this example it is assumed that dispatch unit 5 has reordered sequence of the instructions in the left column of FIG. 5 to execute in the sequence shown in the right column of FIG. 5. The add instruction 0 is first executed followed by original load instruction 2, which loads the data in memory A to register R5. Since the load instruction has executed, its address (memory A) is placed in position 47a and program number (2) is placed in position 49a of load queue 31. Next, store instruction 1 is executed and its generated address (A) is compared with the addresses in position 47 of load queue 31. It can be seen that the store address is equal to the address in position 47a. The present invention (using comparators 41 and 43) then determines if the program number of the store instruction 2 is less than the program number in position 49a of load queue 31. In this example, the store instruction program number 1 is less than the load instruction program number 2 in the load queue and a conflict is present. That is, the store instruction should have been executed prior to the load instruction. These instructions must effectively be reordered to their original sequence and re-executed. This re-execution may be implemented one of various methods, such as actually putting all of the instructions back into their original sequence and re-executing all of them. Another method is to mark the incorrect out of order load instruction as having been executed too early, and then re-executing only those load instructions marked as incorrect, while letting the store instructions complete and put the results in memory. The store instructions do not need to be re-executed since they have been allowed to execute and will precede the re-executed load instructions. The marking of the load may be implemented by setting a flag bit to a binary 1 or 0. In this manner, marking the load is viewed by the processing system as an interrupt which will cause the incorrect load to be re-fetched from the instruction cache unit and re-executed.

Continuing with above example, the add instruction 3 which places the data from registers R5 and R6 into register R7 is then executed and the data from register R7 is stored in memory address A. At this point the present invention again compares the address of the store instruction with the address of the load instruction in position 47a of load queue 31. These addresses are equal (memory address A) and the program number of the store instruction 4 is then compared with the program number of the load instruction 2 in position 47a of load queue 31. In this case, the store instruction program number is greater than the load instruction program number and properly executed after the load instruction. The processing system then continues normal execution operations.

It can be seen that none of the conventional systems allow for detection of impermissible out of order instructions subsequent to execution and prior to the point where their results must be provided to the system. Those skilled in the art will understand that detection of an out of order condition prior to the result of the instruction being committed to the architecture (even if after execution of the instruction) will greatly enhance processor performance.

Although certain preferred embodiments have been shown and described, it should be understood that many changes and modifications can be made therein without departing from the scope of the appended claims.

We claim:

1. A data processing system that executes instructions which access a specific address in memory in a plurality of sequences, comprising:

means for reordering said instructions from a first sequence to a second sequence to enable simultaneous execution of said instructions in said second sequence;

means for storing said instructions in said first sequence, and for storing said instructions in said second sequence simultaneously;

a plurality of execution means for simultaneously executing said instructions in said second sequence; and means for comparing, subsequent to execution of said instructions in said second sequence, whether the address of the non-executed instructions in said first sequence is the same as the address of the executed instructions in said second sequence, and for comparing an instruction number position in said means for storing of instructions in said first and second sequence which access the same address wherein, if the address is the same and the instruction number for instructions in said first sequence is less than the instruction number for instructions in said second sequence, the data processing system continues executing instructions in said second sequence.

2. A system according to claim 1 wherein said means for comparing comprises:

means for storing information relating to a first type of instruction, subsequent to execution of said first type of instruction; and means for providing information relating to a second type of instruction upon execution of said first type of instruction.

3. A system according to claim 2 wherein said first type of instruction and said second type of instruction must be executed in a particular sequence.

4. A system according to claim 3 wherein said information comprises a memory address and program number.

5. A system according to claim 4 wherein said means for comparing further comprises:

means for comparing the memory address of said first and second types of instructions; and means for comparing the program number of said first and second types of instructions.

6. A system according to claim 5 wherein said means for comparing further comprises means for determining that one of said first type of instructions was incorrectly executed out of sequence when the memory address of said first and second types of instructions is equal and the program number of said second type of instructions is less than the program number for said first type of instruction.

7. A system according to claim 6 further comprising:

means for indicating that one of said first type of instructions has been incorrectly executed out of sequence; and means for re-executing said incorrectly executed one of said first type of instruction in a sequence relative to said second type of instructions.

8. A system according to claim 7 wherein said first type of instruction is a load instruction, and said second type of instruction is a store instruction.

9. A system according to claim 8 wherein said means for storing information comprises a load queue.

10. A system according to claim 9 wherein said means for comparing a memory address and said means for comparing a program number comprise circuitry having a plurality of logical elements disposed in said processing system.

11. A computer implemented method for processing data in a system that executes instructions which access a specific address in memory in a plurality of sequences, said method comprising the computer implemented steps of:

reordering said instructions from a first sequence to a second sequence to enable simultaneous execution of said instructions in said second sequence;

storing said instructions in said first sequence, and for storing said instructions in said second sequence in a queue simultaneously;

simultaneously executing on a plurality of execution units said instructions in said second sequence; and comparing, subsequent to execution of instructions in said second sequence, whether the address of the non-executed instructions in said first sequence is the same as the address of the executed instructions in said second sequence, and comparing an instruction number position in said queue of instructions in said first and second sequence which access the same address;

wherein, if the address is the same and the instruction number for instructions in said first sequence is less than the instruction number for instructions in said second sequence, the data processing system continues executing instructions in said second sequence.

12. A method according to claim 11 wherein said step of comparing comprises the steps of:

storing information relating to a first type of instruction, subsequent to execution of said first type of instruction; and providing information relating to a second type of instruction upon execution of said first type of instruction.

13. A method according to claim 12 wherein said first type of instruction and said second type of instruction must be executed in a particular sequence.

14. A method according to claim 13 wherein said information comprises a memory address and program number.

15. A method according to claim 14 wherein said step of comparing further comprises the steps of:

comparing the memory address of said first and second types of instructions; and comparing the program number of said first and second types of instructions.

16. A method according to claim 15 wherein said step of comparing further comprises the step of determining that one of said first type of instructions was incorrectly executed out of sequence when the memory address of said first and second types of instructions is equal and the program number of said second type of instructions is less than the program number for said first type of instruction.

17. A method according to claim 16 further comprising the steps of:

indicating that one of said first type of instructions has been incorrectly executed out of sequence; and re-executing said incorrectly executed one of said first type of instruction in a sequence relative to said second type of instructions.

18. A method according to claim 17 wherein said first type of instruction is a load instruction, and said second type of instruction is a store instruction.

19. A method according to claim 18 wherein said step of storing comprises the step of storing said information in a load queue.

* * * * *